United States Patent [19]

Posson

[11] 4,136,661

[45] Jan. 30, 1979

[54] ROTARY ENGINE

[76] Inventor: Chester A. Posson, 4651 Teonia Woods Rd., Rolling Meadows, Ill. 60008

[21] Appl. No.: 772,085

[22] Filed: Feb. 25, 1977

[51] Int. Cl.² ............................................ F02B 53/00
[52] U.S. Cl. .................................... 123/205; 418/36; 74/32
[58] Field of Search ................ 123/8.47, 43 B; 74/32, 74/31, 30; 418/36, 37

[56] References Cited

U.S. PATENT DOCUMENTS

| | | | |
|---|---|---|---|
| 1,013,139 | 1/1912 | Dittlinger | 123/8.47 |
| 1,497,481 | 6/1924 | Bullington | 123/8.47 |
| 1,576,361 | 3/1926 | Rogers | 123/8.47 |
| 1,732,995 | 10/1929 | Tschudi | 123/8.47 |
| 3,500,798 | 3/1970 | Arnal | 418/37 |
| 3,829,257 | 8/1974 | Goering | 123/8.47 |
| 3,955,541 | 5/1976 | Seybold | 123/8.47 |
| 4,057,374 | 11/1977 | Seybold | 123/8.47 |

*Primary Examiner*—Carlton R. Croyle
*Assistant Examiner*—Michael Koczo, Jr.
*Attorney, Agent, or Firm*—Fitch, Even, Tabin & Luedeka

[57] ABSTRACT

A rotary engine is disclosed having a plurality of rotor blades spaced around an annular chamber and dividing the chamber into separate engine chambers. The rotor blades drive two output shafts which are coupled by a transmission means to provide a single rotational output. The transmission means alternately drives selected of the rotor blades at an increased forward rotational speed while simultaneously driving the other rotor blades in a reverse direction so the latter remain stationary relative to the housing. The alternate driving of the rotor blades varies the volume of the engine chambers formed by the blades to provide expansion and contraction of the engine chambers.

4 Claims, 6 Drawing Figures

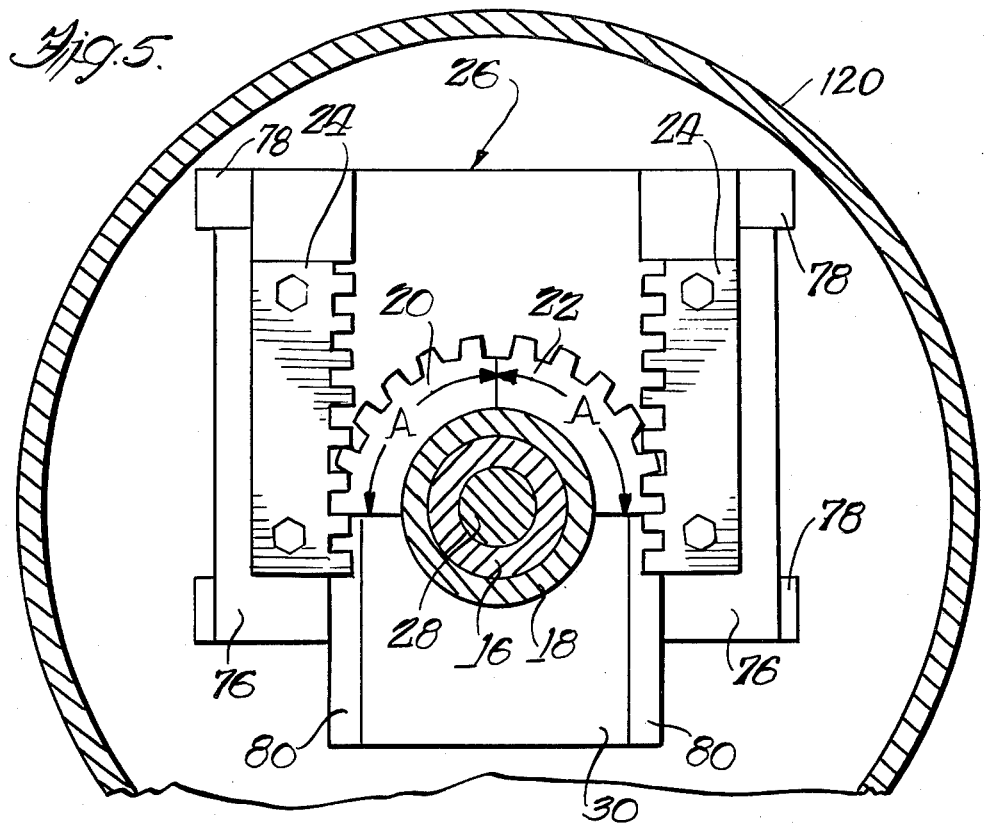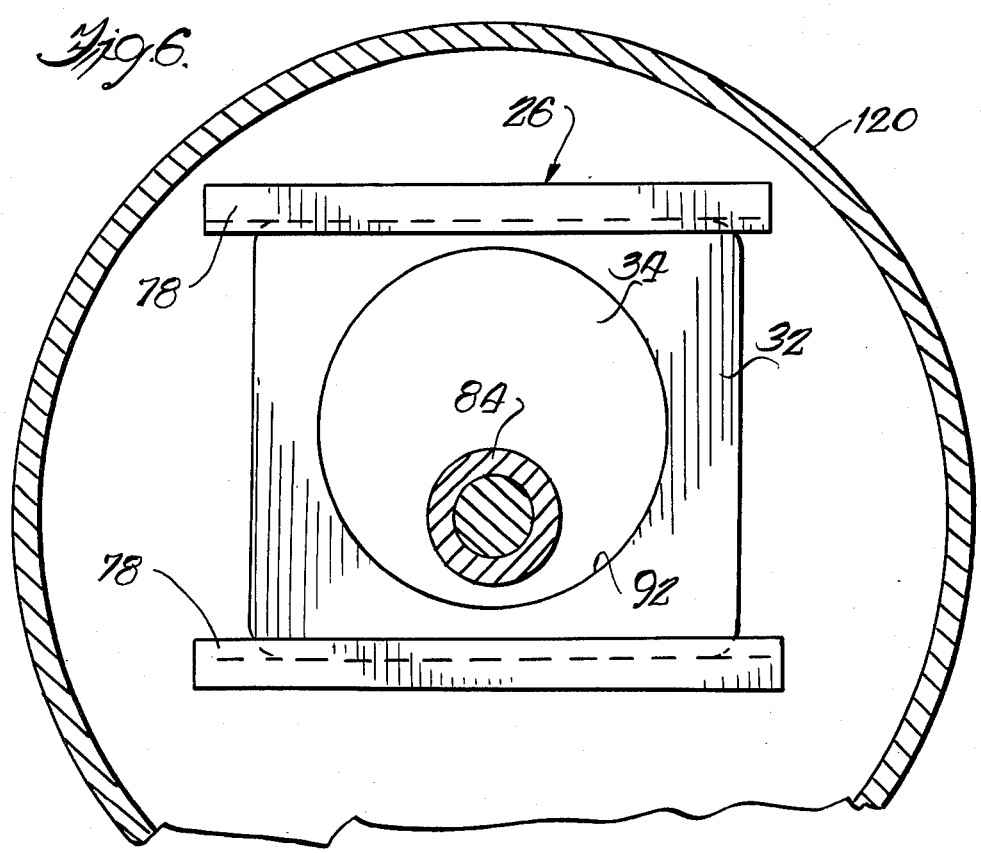

ROTARY ENGINE

The present invention relates generally to engines and more particularly to rotary engines which utilize radially extending rotor blades to divide an annular engine compartment into separate engine chambers.

Rotary engines which utilize rotor blades to divide an engine compartment into separate engine chambers are well known. Such engines may be used as internal combusion engines, either spark ignition or diesel, or may be used to convert compressed steam or air into mechanical power. As the rotor blades rotate, they also oscillate relative to one another to vary the volume of the engine chambers therebetween and to provide the proper cycling of the engine chambers. For an internal combustion engine, oscillation of the rotor blades provides expansion, exhaust, intake and compression cycles for the chambers.

Present rotary engines, however, often require complicated and cumbersome planetary gearing systems to convert the complex rotation-oscillation rotor action to a single rotational output. And most existing engines are only believed to provide up to two power cycles per each rotation of the output shaft.

Accordingly, it is an object of the present invention to provide a rotary engine which is relatively more simple and less cumbersome than "prior art" engines. Another object of this invention is to provide an engine which has more than two power cycles per revolution of the output shaft.

These objects are met by the present invention which provides a rotary engine with an internal annular chamber divided into separate engine chambers between the adjacent blades of two meshing rotor blade assemblies. Each rotor blade assembly drives a separate shaft which is coupled to a transmission means for driving a main output shaft. During each revolution of the rotor blades within the annular chamber, the transmission means alternately drives one of the separate shafts and the attached rotor blade assembly in a reverse direction so that the rotor blades remain stationary relative to the internal chamber while simultaneously driving the other shaft and rotor blade assembly at a forward speed. This occurs simultaneously with the rotation of the blades within the annular chamber and provides an alternating expansion and contraction of each engine chamber formed between the rotor blades. When each rotor blade assembly has two opposed blades, thereby dividing the annular chamber into four engine chambers, the alternate driving by the transmission means may provide up to four power cycles, one in each engine chamber, for each full revolution of the rotor blades.

These and other objects of the present invention are disclosed in the following detailed description and the accompanying drawings of which:

FIG. 5 is a partial vertical sectional view taken along line 5—5 of FIG. 1.

FIG. 6 is a partial vertical sectional view taken along line 6—6 of FIG. 1.

Figure 1:
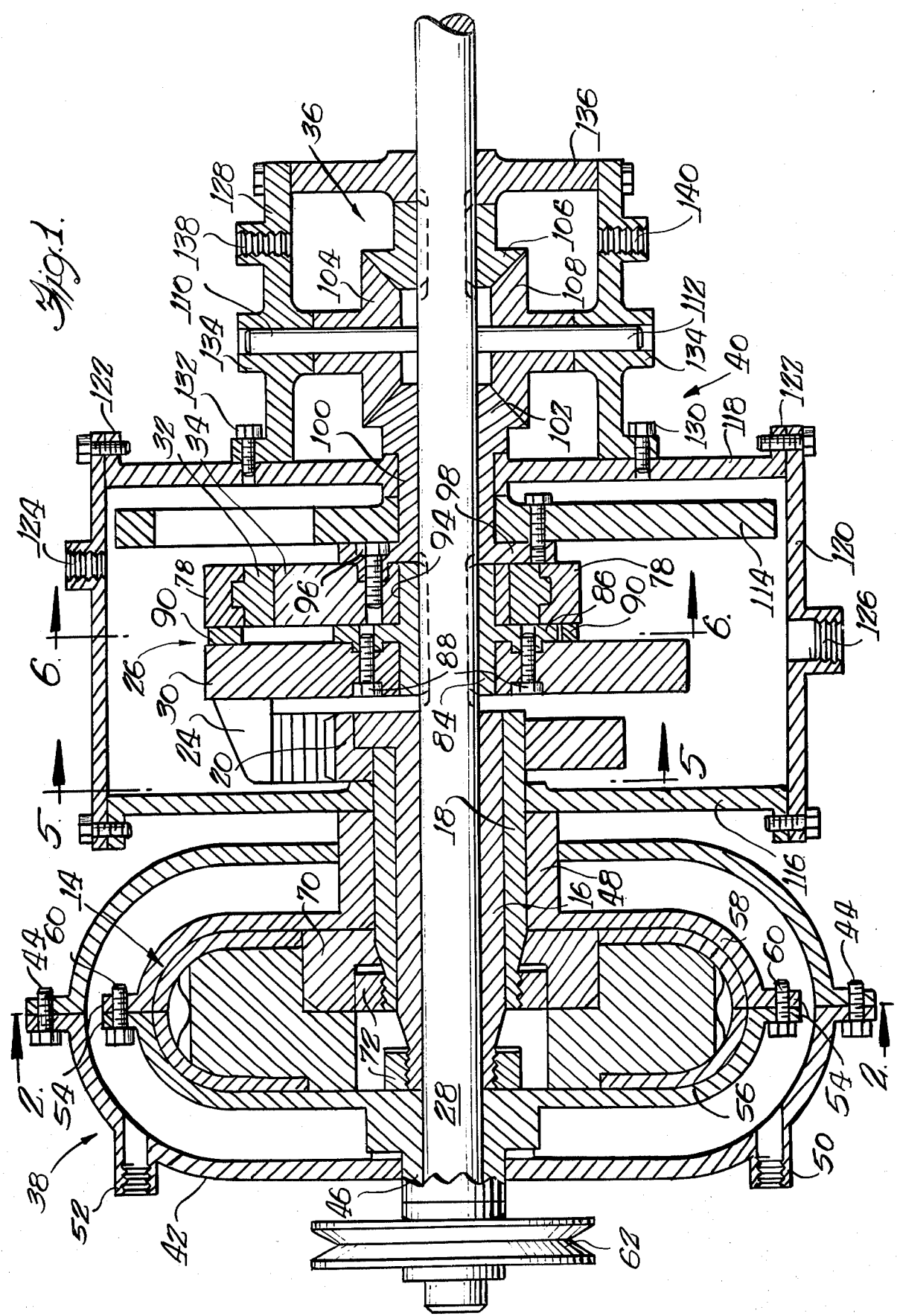
FIG. 1 is a vertical sectional view of a rotary engine embodying the present invention.

The present invention is embodied in a rotary engine which utilizes radially extending rotor blades to divide an annular engine compartment into separate engine chambers. Relative rotational motion between the rotor blades alternately enlarges or reduces size of the engine chambers, thereby providing the repeated cycling of the engine chamber needed for operation as an internal combustion engine as well as for use with steam or compressed air. The relative motion of the rotor blades is coupled by a transmission means to provide a single rotational power output.

In accordance with the present invention, which is illustrated in its preferred embodiment, a novel rotary engine is provided in which two pairs of meshing rotor blades 10 and 12 are mounted within an annular engine compartment defined by an engine housing 14. The rotor blades are in relatively sealed engagement with the interior surface of the engine housing so as to define separate engine chambers between adjacent blades. The rotor blades are carried on concentric shafts 16 and 18 which extend rearwardly through the engine housing. Oppositely disposed pinion gear segments 20 and 22 which are fixed on the ends of shafts 16 and 18 respectively impart the relative rotational movement of the rotor blades for expansion and contraction of the engine chambers. Each gear segment engages one of a pair of parallel, facing gear racks 24 which are mounted on a slider rack 26 which rotates around and drives an output shaft 28.

The slider rack carries two movable slider bars, a front radial slider 30 and a rear cammed slider 32, mounted at right angles to each other within the slider rack. The front radial slider bar is fixed to the output shaft, the rear cammed slider bar carries an eccentric or cam 34 and rotates freely relative to the output shaft. As the slider rack rotates about the output shaft in one direction, it is oscillated radially by the eccentric which is rotated at the same speed, but in the opposite direction by a return gear system, generally at 36. The opposite rotation of the slider rack and the eccentric generates two complete oscillations and returns of the slider rack for each revolution of the rack or the eccentric.

So, when the rotor blade pairs 10 and 12 turn, the concentric shafts 16 and 18 and the pinion gear segments cause the slide rack 26, both the slider bars 30 and 32 and output shaft 28 to rotate in the same direction. By the return gear system 36, and the cam, the slider rack is also caused to oscillate radially as it rotates. The radial oscillation of the gear racks 24 which are attached to the slider rack drives the pinion gear segments and the rotor blades at the end of the concentric shafts through partial revolutions, backward and forward. As one rotor blade pair is driven forward, the other pair is simultaneously driven backward. The gears and the eccentric are proportioned so that the rotor blade pair driven in the reverse direction is driven at a speed approximately equal to the rotational speed of the slider rack and output shaft, and is thereby stationary relative to the housing. Accordingly, the other rotor blade is caused to rotate in the forward direction at twice the average rotational speed. This provides the varying volume for each engine chamber to cycle, whether as an internal combustion engine or in a steam or compressed air mode. Opposite engine chambers in a four-chamber engine undergo the same cycle, whether expansion or contraction, at the same time. As an internal combustion engine, for example, when the one chamber is undergoing an expansion cycle, the other chambers are going through exhaust, intake and compression cycles.

At the end of each oscillation of the gear rack, the rotor blades rotate for a short distance at the same speed relative to the housing. In a spark ignition engine, this portion of the cycle may be used to selectively align one of the engine chambers with the ignition source.

Turning now to a more detailed description of the preferred embodiment of the present invention, the rotary engine has generally two in-line stages or sections—a front engine section generally at 38 and a rear transmission section generally at 40. Both sections are approximately symmetrical about the output shaft 28 which extends the entire length of the engine.

The engine section 38 is the power end of the rotary engine and includes the rotor blades pairs 10 and 12, which are driven by combustion, steam, compressed air or other forces to provide the motive force in the engine. The engine section has a water jacket 42 surrounding the housing 14 which actually encloses the rotor blades. The space between the water jacket and the rotor blade housing permits the circulation of coolant, such as water, to dissipate any heat which may be transmitted through the housing during engine operation.

The water jacket 42 is of annular shape, similar to that of the rotor blade housing 14 and is constructed of two dished or half-oval shells with flanged edges which are bolted together, as at 44, at spaced locations around the perimeter of the jacket. The front half of the water jacket has a center opening which fits over a front hub 46 of the rotor blade housing. Similarly, a center opening in the rear half permits the water jacket to be fitted over a rear hub 48 of the housing. The engagement between the water jacket and housing hubs is sufficiently tight to prevent leakage of coolant. Internally threaded fittings 50 and 52 of the jacket provide an inlet and outlet for circulation of the coolant.

The rotor blade housing 14 defines an internal annular chamber about the central output shaft 28. The housing has a general oval cross-sectional shape, as shown in FIG. 1, with an overall shape similar to the surface of revolution formed by rotating an oval about its minor axis. The housing is fabricated by joining the facing edge flanges 54 of two half-oval shells 56 and 58 by bolts 60 around the perimeter of the shells. Each half-oval shell includes a central hub which is bored for access to the internal annular chamber. The hub 46 of the front shell is bored to permit the insertion of the output shaft 28 and the hub 48 of the rear shell is bored for insertion of the output shaft and the concentric shafts 16 and 18 which are coaxial with the output shaft.

Figure 2:
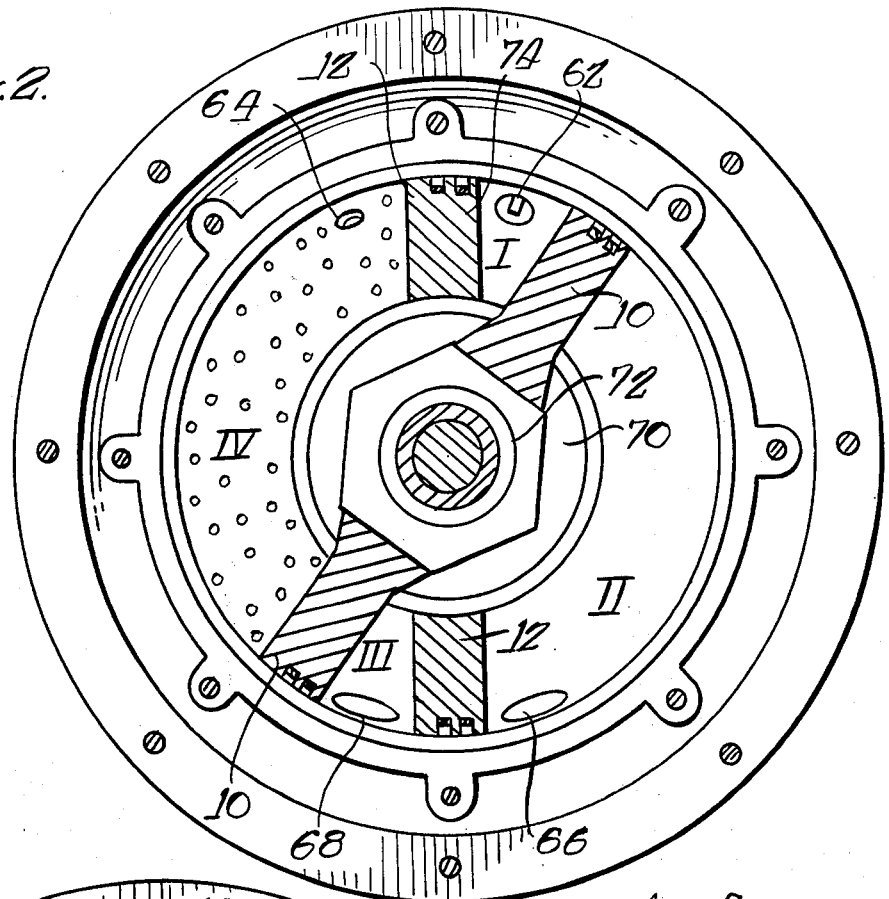
FIGS. 2-4 are sectional views along line 2—2 of FIG. 1 illustrating the progressive movement of the rotor blades during engine operation.
Figure 3:
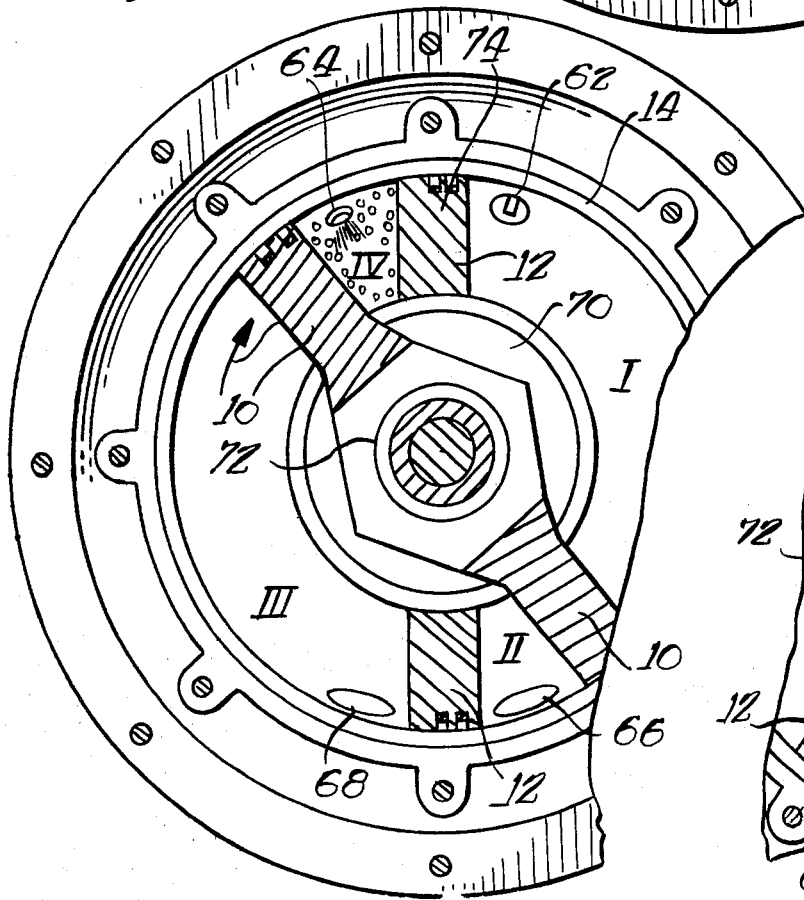
Figure 4:
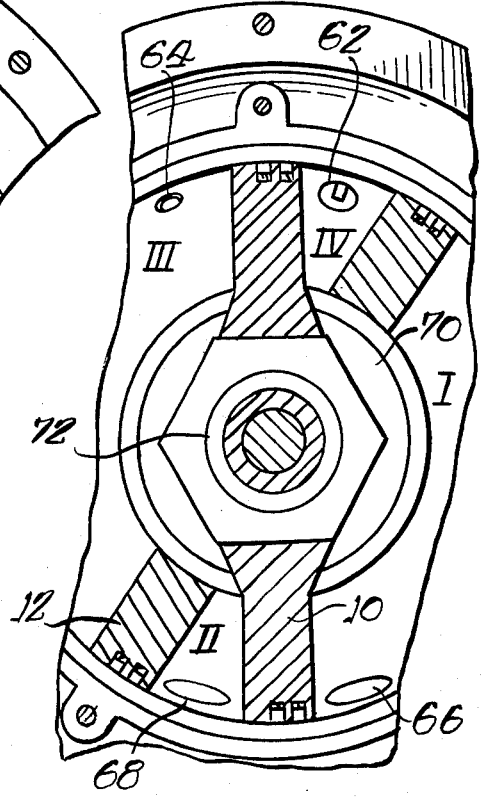

Beyond the front of the engine section 38, the output shaft 28 may carry other equipment, such as a pulley 62 for driving pumps, fans, compressors or the like. To the rear, the output shaft and concentric shafts extend through the rear hub into the transmission section 40 of the engine. Referring to FIGS. 2-4, which illustrates the present rotary engine in an internal combustion mode, the housing 14 may also include an ignition means such as a spark plug 62, a fuel injection port 64 and an exhaust port 66 and air intake port 68.

The internal annular chamber defined by the housing 14 is divided into four separate, wedge-shaped engine chambers by the radially extending rotor blade pairs 10 and 12. Each rotor blade pair is mounted on a solid disc or hub 70, which is fixed on the end of one of the concentric shafts 16 and 18. The concentric shafts are of unequal length and terminate at spaced locations within the annular chamber. The end of each shaft is tapered and threaded and each disc has a central bore along its axis of rotation for fitting the disc or hub on the end of its respective concentric shaft. The discs may be held in place by retaining nuts 72 screwed onto the threaded end of the concentric shafts. Mounted in this manner, the discs, which rotate with the concentric shafts, are parallel and are spaced laterally along the output shaft within the engine chamber.

Two rotor blades 74 of like construction extend radially from the edge of each disc. Preferably the rotor blades are spaced 180° apart and have flat side surfaces. In practice, the disc and rotor blades may be one-piece construction or they may be separate pieces joined as by welding or other mechanical attachment. In either case, the rotor blades and discs should be manufactured from steel or other material sufficiently strong to withstand the forces which occur during engine operation.

To form substantially closed engine chambers, which are necessary for engine efficiency, the end of each rotor blade is curved, as shown in FIG. 1, to conform to the oval shape of the annular chamber. Each rotor may also have a wiper (not shown), similar to a piston ring, fitted along its edge to actually engage the interior surface of the housing 14 so as to provide an even better seal for the engine chamber. To slidably engage the inner surfaces of both front and rear half-shells of the rotor blade housing, each rotor blade must extend across the next adjacent rotating disc. Accordingly, the rotor blades interlock and mesh, that is, rotor blades mounted on one disc extend across the adjacent disc and rotor blades on that disc or hub extend back across the first. In this manner, the rotor blades divide the annular chamber into wedge-shaped engine chambers, each of which is bounded on the two radially extending sides by two adjacent rotor blades, one from each pair 10 or 12, on the inside edge by the rotating discs or hubs 70 on the remaining sides by the housing 14.

The motive force applied to the rotor blades during engine operation whether by the combustion of fuel, steam, or compressed air, is transmitted through discs 70 and the coaxial shafts 16 and 18 to the transmission section 40. The partial pinion gear segments 20 and 22 are fixed by welding or other attachments to the transmission end of each coaxial shaft 16 and 18, respectively. The coaxial shafts terminate at spaced locations in the transmission section but the pinion gear segments are mounted so as to be in the radial plane around the output shaft. These pinion gear segments are oppositely directed so that each segment engages one gear rack 24, which is mounted for oscillation on the slider rack 26.

The slider rack 26 is made of two pair of spaced, parallel slider legs, a front pair 76 and a rear pair 78 fastened together at a 90° angle. The main output shaft extends through the mesh formed by the interlocking legs. The facing sides of each pair of slider legs are slotted or grooved to receive a slider bar. The facing sides of the legs of the front pair 76 are slotted for slidably receiving the side ribs 80 of the radial slider bar 30 which is fixed to the output shaft. Each gear rack 24 is mounted, by bolting, welding or similar attachment, to the front side of one leg of the front pair 76. The pinion gear segments on the concentric shafts are sized to mesh with the gears on the gear racks. When the rotor blades are turned, the concentric shafts rotate, and the engagements between the gear segments and gear racks causes the slider rack to rotate in the same direction. In simple rotation of the rotor blades, there is no rotation of the pinion gear segments relative to the gear racks, for the gear racks rotate with the gear segments around the output shaft.

The rotation of the slider rack 26 is transmitted to the output shaft 28 by the radial slider bar 30 which is fixed to the output shaft and slidably mounted between the front pair of slider legs 76 of the slider rack. The radial slider bar is generally a flat plate, of preferably metallic construction. The sides of the slider bar have outstanding ribs 80 which are slidably received within the grooves on the facing sides of the front pair of legs 76.

The radial slider bar 30 is fixed to the output shaft by an internally splined sleeve 84 which engages matching spline on the output shaft 28. The sleeve extends the length of the slider rack and has a radial ring or flange 86 which is spaced between the radial slider bar 30 and the rear cammed slider bar 32. The radial slider bar has a center passageway or bore through which the output shaft and the matching sleeve extend and is fixed to the sleeve by bolting at 88 to the radial flange 86. In lighter-duty applications, a Woodriff key or even a cotter pin may suffice to secure the slider bar to the output shaft.

Accordingly, as the slider rack is rotationally driven by the rotor blades, via the concentric shafts 16 and 18, pinion gear segments 20 and 22 and gear racks 24, the slider rack causes the radial slider bar to rotate with it, which in turn rotates the output shaft in the same direction.

The rear pair of legs 78 of the slider rack 26 is secured to a ninety degree (90°) angle to the front pair 76, in a cross-hatched arrangement. The front legs are attached to the rear legs at spacers 90 by bolting, welding or the like.

The facing sides of the rear pair of slider legs are also longitudinally grooved to receive outstanding side ribs of the cammed slider bar 32. The rear cammed slider bar is similar to that of the front radial slider bar 30, except that the output shaft does not extend centrally through the cammed slider bar and the bar is not fixed to the output shaft. Rather, as best seen in FIGS. 1 and 6, the cammed slider bar has a large central bore defined by the cylindrical surface 92 in which the eccentric or cam 34 is received and the cam has an off-center bore through which the output shaft 28 and the sleeve 84 extend.

The cam or eccentric 34 is a positive motion cam. It is generally round and disc-shaped, and is slightly undersized relative to the bore within the slider bar so that it can rotate therewithin. The cam also rotates around an outside bearing surface 94 of the splined sleeve 84, which extends from the front edge of the radial slider bar to the rear edge of the cam. The cam is bolted at 96 to a radially extending flange 98 of a shaft 100 which is concentric with the output shaft 28. The concentric shaft 100 extends rearwardly from the flange 98 to a miter gear 102 which meshes with three other miter gears 104, 106, and 108 of the same size and number of teeth to form the return gear loop 36. Miter gears 104 and 108 are idler gears, mounted on the vertical idler shafts 110 and 112.

To drive the cam, the miter gear 106 is connected to the output shaft 28 by a Woodriff key, matching spline or the like. As the output shaft turns the miter gear 106, the miter gears 104 and 108 cause the miter gear 102 to rotate in the opposite direction at the same speed. Thus, the concentric shaft 100 and the attached cam 34 rotate around the output shaft at the same rotational speed, but in the opposite direction. The off-center mounting of the cam or eccentric disc on the output shaft causes oscillation of the rear slider bar 32 in which it rotates. Oscillation of the rear slider bar in the direction parallel to the rear pair of legs 78 of the slider rack 26 is taken up by sliding of slider bar 32 between the rear legs 78. Oscillation in the direction perpendicular to the rear legs, which cannot be taken up by movement of the rear slider bar, causes the entire slider rack to linearly oscillate in that direction, which is generally radial to the output shaft. Since the front pair of legs 76 of the slider rack and the radial slider bar received therebetween are at a 90° angle to the rear legs and cammed slider, oscillation in the direction perpendicular to the rear legs is parallel to the front legs, and thus the front legs of the slider rack slide along the radial slider bar as the rack oscillates.

The linear oscillation of the slider rack 26 and the pair of gear racks 24 mounted thereon causes a partial rotary oscillation of the pinion gear segments 20 and 22 which mesh with the gear racks. As the gear segments are generally oppositely directed, one segment meshing with one of the gear racks, during each linear oscillation of the pair of gear racks, one rotary gear segment is rotated through a partial revolution in one direction by one gear rack, while the other gear segment, engaged in the other gear rack, is rotated through a partial revolution in the opposite direction. And when, a short time later, the gear rack makes a return oscillation, the gear segments are rotated in a direction opposite that of the previous oscillation. Transmitted along the concentric shafts 16 and 18, this oscillation causes each pair of rotor blades to have a varying rotational speed relative to the other pair of blades, and thereby provides a kind of flapping motion of one set of blades relative to the other set. This relative motion periodically causes an expansion and contraction of each engine chamber defined between adjacent rotor blades and permits the engine chamber to perform various cycles of engine operation, e.g., expansion, exhaust, intake and compression cycles in an internal combustion engine.

In particular, the gear ratios for the gear segments and rack gears and the throw for the cam are calculated so that the rotor blade pair which is being driven in the reverse direction relative to the general direction of rotation of the output shaft is substantially motionless relative to the housing 14. And the rotor blades driven in a forward direction rotate at substantially twice the rotational speed of the output shaft. On the return oscillation, the previously motionless rotor blades rotate at substantially twice the output shaft speed and the previously moving blades are relatively motionless. At the end of each oscillation, the gears and cams are also proportioned so that each pair of blades rotates at the same relative speed for a small distance, usually about 15°–20°. When used as an internal combustion engine, this period of equal rotation may be used to bring an engine chamber which has just undergone a compression cycle into registration with an ignition means such as a spark plug 62.

Looking to FIGS. 2–4, which illustrate the rotor blades in various of the engine cycles when the engine is utilized as an internal combustion engine, FIG. 2 depicts engine chamber I in a fully compressed position, with the fuel previously injected through fuel injection port 64, and in registration with the spark plug 62. Engine chamber II has just completed its expansion cycle, chamber III is fully exhausted. Chamber IV has taken in air and is ready to undergo compression and then will receive an injection of fuel by a fuel injector located at the fuel injection port 64. Ignition and expansion of the hot gases in chamber I causes the rotor blade pair 10 to move to the position indicated in FIG. 3. This is coordinated with oscillatory motion of the slider rack 26 which holds the rotor blade pair 12 stationary by driving its pinion gear segment 20 in the reverse direction while driving the blade pair 10 in an accelerated forward direction. The upright blade 74, of the pair 10 acts as a stationary wall to the engine chamber I during this combustion. Although one blade is moving and one is stationary, combustion forces are exerting pressure on both and, in effect, both are driving the pinion gear segments in the direction they are moving, which translates, via the slider rack, cammed slider bar 32 and cam 34, concentric shaft 100 and return gear system 36 into output shaft 28 power.

During the movement of the blade pair 10 to the position indicated in FIG. 3, chamber II undergoes an exhaust cycle, the spent gases being exhausted through the exhaust port 66. Engine chamber III has expanded, drawing in air through the intake port 68. And engine chamber IV has compressed the air it contained and has been injected with fuel in a sufficient amount for combustion through the injection port 64. The fuel injection system (not shown) is driven by the engine and it preferably injects the fuel into the compressed air in chamber IV just prior to the movement of the compressed air of chamber IV to the position shown in FIG. 4. FIG. 3 depicts the rotor blades at the end of one of the oscillations of the slider rack. Between FIGS. 3 and 4, the rotor blade pairs 10 and 12 move at the same relative speed to bring the engine chamber IV into registration with the spark plug. Upon ignition, the previously stationary rotor blade pair 12 is driven forward at substantially twice the rotational speed of the output shaft while the rotor blade pair 10 is driven by the gear rack 26 and pinion gear segment 22, in a reverse direction so as to remain stationary relative to the housing. This action corresponds to the return movement of the slider rack discussed above, and the engine chambers IV, I, II and III undergo the same cycles as did chamber I, II, III and IV, respectively, in the previous rotor blade movement. So, in one-half of a full rotation by the rotor blade pair 10, two combustions have occurred, one in chamber I and one in chamber IV. Following this sequence, in the next one-half rotation combustion will also occur in chambers III and II, so that four combustion cycles occur for every full rotation of the rotor blades, providing maximum power output for the engine, equivalent to an 8-cylinder piston engine.

Although described in detail as an internal combustion engine, the rotary engine described here can also function by steam or compressed air. In such case, the rotor blade action would still be the same, but there would be no fuel injection port, and the ignition means then would be replaced by an injection port for steam or compressed air. And even as an internal combustion engine there need not be a spark plug, if the engine is operated on a diesel cycle.

To provide the relative motion described above, each pinion gear segment has an arc, denoted as A in FIG. 5, of at least 80° but not greater than 89°. The preferred ratio of the cam throw to the pitch diameter of the pinion gear segments is 0.2617. And the length of the gear racks should not be less than the throw of the cam divided by 0.3785.

To provide a smoother engine operation, a flywheel 114 is mounted on the concentric shaft 100, just behind the slider rack 26. The flywheel is preferably metallic, and is of sufficient mass to provide momentum for the engine while reducing vibrational and shock forces.

The pinion gears 20 and 22, slider rack 26, gear racks 24 and flywheel 114, rotate in an oil-bath housing. The housing has a front circular plate 116 mounted against the rear hub 48 of the rotor blade housing 14. The plate has a center opening for passage of the output shaft 28 and the concentric shafts 16 and 18. A rear circular plate 118 is secured behind the flywheel and seals around the rear concentric shaft 100. A cylindrical side wall 120 is bolted to edge flanges 122 on the end plates and seals the space therebetween. Threaded passageways 124 and 126 are provided in the shell for lubricating oil fill and drainage.

Rearwardly of the circular plate 118, the return gear system is enclosed by a cylindrical shell 128 bolted to the plate 118 by bolts 130 and 132. A pair of raised bosses 134 with a center bore in each receive the vertical idler shafts 110 and 112. The cylindrical shell 128 is closed at the rear by a circular plate 136 which has a center bore for passage of the output shaft. Threaded openings 138 and 140 are provided in the cylindrical shell for lubricating oil fill and drainage.

The operation of the present rotary engines may be particularly summarized by describing the hypothetical start-up of the engine. A starting motor and gear (not shown) turn the flywheel in a counterclockwise direction. The flywheel, which is fixed to the radial flange 98 of the concentric shaft 100, turns the shaft and the attached bevel gear 102. Via the equivalent idler gears 104 and 108, the bevel gear 106 and the output shaft 28 to which it is attached are rotated clockwise at the same speed as the concentric shaft 100 is rotated counterclockwise. The output shaft is secured by the spline sleeve 84 to the radial slider bar 30. Because the radial slider bar is sandwiched between the two front legs of the slider rack 26, rotation of the slider bar clockwise causes the slider rack to rotate in the same direction. Simultaneously, the cam or eccentric 34 which is attached to the radial flange 98 of the concentric shaft 100 rotates counterclockwise within the cammed slider bar 32. Of course, the cammed slider bar itself, which is received between the rear legs of the slider rack must rotate clockwise with the slider rack. Therefore, for every degree of counterclockwise rotation of the cam, the slider rack and cammed slider bar are rotated clockwise one degree, and there is a relative movement between the cam and the slider rack and bar of two degrees. As described earlier, the rotation of the cam within the slider bar causes the bar and slider rack to oscillate in the direction generally perpendicular to the rear legs of the rack. The displacement of the slider rack during oscillation depends on the throw of the cam, the greater the throw the larger the displacement.

When the slider bar 32 is oscillated in a direction perpendicular to the rear legs 78, the front legs 76 of the rack, which are at right angles to the rear legs, slide along the radial slider bar 30. Sliding between the cammed slider bar 32 and rear legs of the slider rack compensates for oscillation of the cammed slider bar in the direction parallel to the rear legs, and so the slider rack is not moved in that direction. Moreover, movement of the slider rack in that direction, parallel to the rear legs, is prevented by side abutment between the front legs and the radial slider bar. It should be noted that the slider rack is rotating in the same direction and at the same speed as the output shaft 28 while it is simultaneously oscillating due to the action of the cam 34.

Because of the relative rotational movement between the cam 34 and the cammed slider bar 32, for every 90° rotation of the cam or slider bar, there is 180° of relative rotation between them, during which one-half of a full oscillation and return of the slider rack 26 has been completed. When the rotation is continuous the slider rack is oscillated four times, or two complete oscillation cycles during each revolution of the cam or the cammed slider bar. Since the cammed slider bar is directly connected to the output shaft 28 by the slider rack and radial slider bar 30, each revolution of the cammed slider bar corresponds to one revolution of the slider rack and the output shaft.

The rack gears 24 which are mounted on the front legs 76 of the slider rack 26, and engage the pinion gear segments 20 and 22 oscillate linearly with the slider rack. The linear oscillation of the gear racks causes the pinion gear segments to make periodic partial revolutions in one direction and then partial revolutions in the opposite direction. In essence, the meshing of the gear racks and pinion gear segments converts the linear oscillation of the gear racks to a rotary oscillation in the pinion gears. The extent of partial revolution of the pinion gear segments depends on the displacement of the gear rack during its linear oscillation and this, of course, depends on the throw of the cam 34 which causes the oscillation.

The motion of the slider rack 26 is transmitted to the rotor blade pairs 10 and 12 by the engagement between the gear racks 24 and the pinion gear segments 20 and 22 and the concentric shafts 16 and 18. The meshing of the gear rack and pinion gear segments serves to transmit the simple rotary motion of the slider rack to the rotor blades, as well as simultaneously imparting periodic rotary oscillations to the blades by the linear oscillation of the slider rack. Thus, the rotor blades make partial revolutions backward and forward while rotating continuously in the clockwise direction of the slider rack. The gearing between the concentric shafts 16 and 18 and the gear racks 24 is calculated to transmit the oscillations of the slider rack so that alternately one set of rotor blades travels in a reverse direction at the same speed as the continuous rotational speed of the slider rack, so that the rotor blades remain stationary relative to the housing. At the same time the other pair of rotor blades rotates in a forward direction at twice the continuous rotational speed. This motion provides an alternate expansion and contraction of the engine chambers defined between the respective rotor blades.

As described earlier, the intake port 68 and spark plug 62 are positioned to register with each engine chamber when it is undergoing expansion. For intake, the expansion draws air or oxygen into the chamber, for combustion, the relative stationary blade serves as a fixed combustion chamber wall as the rotating blades enlarges the chamber for the expanding hot gases which exert pressure on both blades forming the chamber.

As the blades oscillate and two opposing engine chambers are enlarging or expanding, the other two engine chambers are being contracted. The exhaust port 66 is located so that in the engine chamber in which combustion has previously taken place, contraction will expel the spent gases and any unused fuel. The opposite chamber undergoing contraction has previously taken in air and the contraction of the engine chamber serves to compress the air and then fuel is injected into the compressed air through fuel injection port 64 in preparation for ignition by the spark plug.

At the end of each oscillation, the slider rack 26 rotates for short distance without oscillating. This movement is provided when the disc-shaped cam 34, the criteria for which was described earlier, is at a dead center position. This simple rotation (without oscillation) of the slider rack is transmitted through the gear racks 24, pinion gear segments 20 and 22 and concentric shafts 16 and 18 to cause the rotor blade pairs 10 and 12 to move for a short distance at the same relative speed, which is the same speed as the continuous rotational speed of the slider rack and output shaft. This short movement of the rotor blades serves to bring the air and fuel in the compressed engine chamber into registration with the spark plug or other ignition means. Combustion of the fuel and air mixture forces the two rotor blades forming the engine chamber to separate, thereby providing the power to keep the engine in motion. The slider rack oscillates four times during each rotation of the output shaft, and since combustion occurs in one of the engines at the end of each oscillation, there are four combustion occurrences, one in each engine chamber, for each rotation of the output shaft.

The force exerted on the rotor blades 10 and 12 is divided and transmitted rearwardly to the output shaft 28 along two paths. Firstly, the force may be carried through the concentric shafts 16 and 18, pinion gear segments 20 and 22, rack gears 24, slider rack 26 and radial slider bar 30 to the output shaft. In addition, the force exerted on the rotor blades may also drive the output shaft by way of the mechanical loop formed by the slider rack, the cammed slider bar 32, the cam 34, the concentric shaft 100 and the return gear system 36 to the output shaft 28.

It may accordingly be seen that the present invention provides a new and unique rotary engine which has power output equivalent to an 8-cylinder piston engine. A surprisingly novel transmission system is used to convert the complicated oscillatory movement of the rotor blades to a single output shaft rotation without the complex and cumbersome ring or planetary gear system used in some prior rotary engines. Instead, a compact slider system, rotating in a lubricating oil bath, serves to couple the output of the rotor blades while simultaneously imparting the relative motion to the rotor blades which provides for an alternating expansion and contraction of the engine chambers defined between the rotor blades.

Although this invention has been described in terms of its preferred embodiment, various changes may be made, some of which may be immediately obvious and some of which may be ascertained only after study, without departing from the present invention.

What is claimed is:

1. A rotary engine comprising:
   a housing defining an internal annular chamber,
   first and second concentric shafts extending through said housing and terminating at one end within said annular chamber,
   a first pair of radially extending rotor blades centrally mounted within said annular chamber on said first concentric shaft, said rotor blades in substantially sealed engagement with the surface of said annular chamber,
   a second pair of radially extending rotor blades centrally mounted within said annular chamber on said second concentric shaft, said rotor blades in substantially sealed engagement with the surface of said annular chamber, said first and second pair of rotor blades being alternately spaced to divide said annular chamber into four engine chambers, a pinion gear segment fixed on the end of each concentric shaft exterior of said housing, an output shaft carried adjacent said housing, a slider rack having two pair of parallel slider legs disposed at right angles to each other to form a cross hatch, said output shaft extending through the said cross hatch, a first slider bar slidably received between one pair of said parallel slider legs and fixed to said output shaft, a second slider bar slidably received between the other pair of said slider legs and rotatable relative to said output shaft, a disc cam mounted within said second slider bar and positively engaged therewith, a return gear system engaging said output shaft and said cam to rotate said cam opposite the rotation of said output shaft, rotation of said slider rack serving to rotate said first and second slider bars and said output shaft in one direction and said cam in the opposite direction, the rotation of said cam causing said second slider bar and said slider rack to oscillate linearly as they rotate, a pair of parallel facing gear racks mounted on said slider rack, each gear rack engaging one of said pinion gears whereby linear oscillation of the slider rack and the gear racks thereon will cause the pinion gear segments, concentric shafts and rotor blades to move through partial revolutions backwards and forwards, alternately expanding and contracting said engine chambers to provide selected expansion, compression, intake and exhaust cycles.

2. A rotary engine comprising:

a housing forming an internal annular chamber, fuel injection means communicating with said annular chamber, ignition means disposed for providing ignition within said chamber, exhaust means communicating with said annular chamber, a first pair of rotor blades carried within said annular chamber and in relatively sealed engagement therewith, a first shaft extending from said housing and driven by said first pair of rotor blades, a second pair of rotor blades rotatably carried within said annular chamber and in relatively sealed engagement therewith, a second shaft extending from said housing and driven by said second pair of rotor blades, said rotor blades being spaced alternately around said annular chamber to divide said annular chamber into four closed engine chambers, transmission means for rotating said shafts and rotor blade pairs at an average rotational speed in a forward direction, said transmission means including driving means for alternately driving one pair of said rotor blades in a reverse direction relative to the other pair of rotor blades at a speed equal to said average rotational speed whereby said pair of rotor blades remains stationary relative to said housing while simultaneously driving the other pair of rotor blades at a forward speed approximately equal to said average rotational speed whereby said other pair of rotor blades rotates at approximately twice the average rotational speed relative to said housing, said transmission means further driving both pairs of rotor blades at the same rotational speed during a portion of each rotation of said rotor blades to register each of said engine chambers when it is contracted with said ignition means to provide ignition within said engine chamber, said fuel injection and exhaust means also being in registration with selected ones of said engine chambers whereby such engine chamber undergoes expansion, exhaust, intake and compression cycles during one full revolution of said rotor blades within said chamber, said transmission means comprising slider means carried on a main output shaft for rotation therewith and movable in a direction radial to said main output shaft, a pair of rack gears mounted on said slider means, a pair of pinion gear segments, each of said segments carried on one of said first or second shafts and meshing with one of said rack gears, said meshing serving to rotate said concentric shafts as said slider means and output shaft rotate, means associated with said output shaft for linearly reciprocating said slider means and said rack gears, said reciprocating motion of said rack gears imparting said alternating motion to said rotor blades for expansion and contraction of said engine chambers.

3. A rotary engine in accordance with claim 2 in which said means for reciprocating said slider means comprises a cam means positively engaging said slider means in the direction of oscillation and means for rotating said cam means in a direction opposite the direction of rotation of said slider means.

4. A rotary engine in accordance with claim 3 in which said cam means is a disc cam having a sufficient throw so that at the end of each reciprocation of said slider means, said slider means is stationary relative to said pinion gear segments for a portion of the rotation of said output shaft, whereby said rotor blades in said annular housing are rotated at the same relative speed to bring selected of said engine chambers into registration with said ignition means.

* * * * *